United States Patent [19]

Theiste et al.

[11] Patent Number: 5,278,693
[45] Date of Patent: Jan. 11, 1994

[54] TINTED SOLUTION-PHASE ELECTROCHROMIC DEVICES

[75] Inventors: David A. Theiste, Wyoming; Harlan J. Byker, Zeeland, both of Mich.

[73] Assignee: Gentex Corporation, Zeeland, Mich.

[21] Appl. No.: 820,998

[22] Filed: Jan. 13, 1992

[51] Int. Cl.$^5$ .............................................. G02F 1/15
[52] U.S. Cl. ..................................... 359/272; 359/265; 252/583
[58] Field of Search ............... 359/265, 267, 272, 274, 359/270; 252/583

[56] References Cited

U.S. PATENT DOCUMENTS

| | | | |
|---|---|---|---|
| 4,801,195 | 1/1989 | Kawai et al. | 359/265 |
| 4,848,878 | 7/1989 | Lee et al. | 369/265 |
| 4,902,108 | 2/1990 | Byker | 359/265 |
| 4,917,824 | 4/1990 | Lynam et al. | 252/582 |
| 5,100,523 | 3/1992 | Helms et al. | 359/265 |
| 5,115,346 | 5/1992 | Lynam | 359/265 |
| 5,128,013 | 7/1992 | Helms | 359/265 |
| 5,145,609 | 9/1992 | Varaprasad et al. | 252/583 |

OTHER PUBLICATIONS

"Hawley's Condensed Chemical Dictionary"; Revised by N. I. Sax and R. J. Lewis, Sr., Van Nostrand Reinhold Company, N.Y. ©1987 pp. 990 and 331.

Primary Examiner—Scott J. Sugarman
Assistant Examiner—Evelyn A. Lester
Attorney, Agent, or Firm—Foley & Lardner

[57] ABSTRACT

The invention provides improved solution-phase electrochromic devices, wherein the solution of reversibly variable transmittance is tinted with a tint-providing compound, and solutions of reversibly variable transmittance for use in the improved devices of the invention. An electrochromic device of the invention can be used, for example, as the component of reversibly variable transmittance in a variable-reflectance motor vehicle mirror. Among such mirrors provided by the invention are blue-tinted mirrors.

30 Claims, No Drawings

TINTED SOLUTION-PHASE ELECTROCHROMIC DEVICES

TECHNICAL FIELD

The present invention relates to solution-phase electrochromic devices, solutions used as media of reversibly variable transmittance to light in such devices, and apparatus in which such devices are employed as components to provide variable coloring or transmittance to light. Among such apparatus are display devices, variable transmittance windows, and variable reflectance mirrors, including dimmable rearview mirrors used in motor vehicles.

BACKGROUND OF THE INVENTION

Solution-phase electrochromic devices and various applications thereof are described in, e.g., U.S. Pat. Nos. 4,902,108 (the '108 Patent), 3,806,229, and 3,451,741; U.S. patent application Ser. Nos. 515,511, filed Apr. 30, 1990, and 720,170 and 720,177, both filed Jun. 25, 1991, all three of which are commonly owned with the present Application; European Patent Application Publication Nos. 0 012 419, 0 430 684, 0 430,686, and 0 435 689; and Chang, "Electrochromic and Electrochemichromic Materials and Phenomena," in Kmetz and von Willisen, eds., Non-emissive Electrooptic Displays, Pergamon Press, New York, New York, USA, pp. 155-196 (1976). All of these patents, patent applications and articles are incorporated herein by reference.

In typical solution-phase electrochromic devices, and particularly such devices which are single-compartment and self-erasing, a solution is held in a thin layer in a compartment formed by two walls, which are typically of glass or clear plastic and at least one of which (including the electrode layer described below) is transparent to light (electromagnetic radiation of wavelength in the visible range), and by spacers or sealant between, and holding apart, the two walls and forming the periphery of the compartment holding the solution. The sides, which face each other and are in contact with the solution, of the two walls are each coated with an electrode layer, which is a layer of material, such as tin oxide, tin-doped indium oxide, indium tin oxide, fluorine-doped tin oxide, gold, rhodium or the like, which is electrically conductive and forms an electrode in contact with the solution. When a sufficient potential difference is applied between the electrode layers, across the solution, the transmittance of the solution changes at at least one wavelength in the visible range and, as a consequence, the solution changes color, becomes darker, or becomes clearer. Typically, the solution in such a device will be clear or slightly colored (tinted) in its zero-potential, equilibrium state and will be darkened through electrochemical reaction(s) when a potential difference is applied. In a solution-phase device, the electrochromic compounds (those which have a change in transmittance in the visible wavelength range upon electrochemical oxidation (anodic electrochromic compound) or reduction (cathodic electrochromic compound) remain in solution upon oxidation or reduction in operation of the device. In the preferred single-compartment, self-erasing devices, there is one solution compartment, both anodic and cathodic electrochromic compounds are together in the same solution and free to diffuse throughout the entire solution, and self-erasing occurs, when there is no potential difference between the electrode layers, as oxidized anodic compound reacts with reduced cathodic compound to return both to their zero-potential equilibrium states. Solutions of variable transmittance in solution-phase electrochromic devices may comprise components in addition to solvent and electrochromic compounds. Such components may include inert, current-carrying electrolyte; thickening or gelling agents such as polymethylmethacrylate; and UV-stabilizing agents, which are compounds which inhibit degradation of the electrochromic compounds upon exposure to ultraviolet (UV) radiation.

In practical applications, such as dimmable rearview mirrors for motor vehicles, variable transmittance windows, or display devices, the electrochromic compounds and other components in the solutions of variable transmittance in solution-phase electrochromic devices must be stable to a range of environmental conditions (e.g., temperature variations, changes in intensity of UV radiation) and over a large number, typically on the order of at least 10,000 to 100,000, cycles of darkening and clearing (i.e., applying and removing electrochemical potential), which also may occur over a range of environmental conditions.

Generally, adding a component, particularly one which consists of a potentially reactive organic compound, to the solution of variable transmittance of a solution-phase electrochromic device, destabilizes the device to variations in environmental conditions and cycling between dark and clear states. This destabilization may occur, for example, on account of chemical reactions of the added component, with oxidized anodic or reduced cathodic electrochromic compound, that result in degradation of the electrochromic compound. Such destabilization generally disadvantageously reduces the cycle life of a solution-phase electrochromic device, i.e., the number of times the device can be varied in transmittance to light by application of a potential between the electrodes and returning the potential (across the solution) to zero or near zero and retain, in the cycling, an acceptable change in transmittance. Reduction in the cycle life of an electrochromic device reduces, and may eliminate, the practical value and commercial acceptability of the device, the solution of variable transmittance employed in the device, or apparatus, which employ the device as a component of variable transmittance.

Some commercially available, sideview or outside rearview mirrors for use on motor vehicles have a blue tint (a slightly blue coloration). The associated, enhanced reflectance on the blue end of the visible light spectrum, as compared to the green, yellow and red portions of the spectrum, has been purported to improve rear vision at night, because the spectral sensitivity of the human eye is somewhat shifted to the blue end of the spectrum on going from day (photopic) vision to night (scotopic) vision. Blue-tinted mirrors, as compared to achromatic mirrors, may have some effect on glare from headlights of following vehicles at night since these mirrors tend to reflect less of the longer wavelength green, yellow and red light that predominates in most motor vehicle headlights and provide better contrast by enhanced reflectance of the shorter wavelength blue light which is more abundant in reflected moonlight and certain types of street lights than in headlights. In addition, since blue tinted mirrors have generally appeared on luxury vehicles, the blue tint of the mirrors has come to be associated with luxury or elegance.

With electrochromic, dimmable, outside rearview mirrors, the concern for glare from following-vehicle headlights is significantly diminished, because the reflectance of the electrochromic mirror can be reduced to levels where little or no glare is perceived by drivers during night driving. However, presumably because of the luxury or elegance factor associated with conventional (non-electrochromic) rearview motor vehicle mirrors, the desire for a blue tint in the high reflectance state of the dimmable, electrochromic mirrors, especially those to be used outside the vehicle, has remained.

The blue tint of conventional mirrors can be obtained by using colored coatings in contact with the reflector or by placing interference coatings, which reflect predominantly blue light, on a flat substrate like a sheet of glass. Similar types of colored or interference coatings could be placed somewhere in the structure of an electrochromic rearview mirror, but this would be undesirable because it would add cost and complicate manufacturing.

A problem in the art, then, has been to find a way to conveniently add desirable tints (slight colorations) to solution-phase electrochromic devices in their zero-potential, equilibrium states. With such devices used as variable transmittance components of variable reflectance ("dimmable") rearview mirrors for motor vehicles, a desired tint is blue. With such devices employed as the variable transmittance components in other types of variable transmittance or variable reflectance apparatus, tints of colors other than blue (e.g., yellow) are sometimes desirable.

SUMMARY OF THE INVENTION

Unexpectedly we have discovered that, with solution-phase electrochromic devices, a material (a tint-providing compound) imparting a desirable color can be added directly to the solutions of variable transmittance of the devices without noticeable loss of electrochromic cycle life or loss of stability of the solution on exposure to UV-radiation in sunlight.

It has been discovered, surprisingly, that the addition of certain materials which provide a tint to the solution, used in solution-phase electrochromic devices, can give the devices a desirable colored appearance in their high transmission or high reflectance condition without interfering with the durability of the devices.

For a solution-phase electrochromic device for which the solution is comprised of propylene carbonate as solvent, 5,10-dihydro-5,10-dimethylphenazine as the anodic compound (i.e., the anodic electrochromic compound), 1,1'-dibenzyl-2,2',6,6'-tetramethylbipyridinium difluoroborate as the cathodic compound (i.e., the cathodic electrochromic compound), polymethylmethacrylate as thickening agent and ethyl 2-cyano-3,3'-diphenylacrylate as UV stabilizing agent, the preferred color tint materials for providing a blue tint are azulenes, which are compounds of Formula XII, defined hereinbelow. Similarly, quinoline yellow can be employed to provide a yellow tint to such solutions, without significant adverse effect on the cyle life or stability to UV-radiation of the solutions or the devices, in which the solutions provide reversibly variable transmittance.

While solution-phase electrochromic devices with a blue tint may initially find commercial application in rearview mirrors for motor vehicles, our invention of solution-phase electrochromic devices with tints of various colors in the solutions of variable transmittance in the devices should find application in a wide variety of display, window, and mirror applications.

DETAILED DESCRIPTION OF THE INVENTION

In one of its aspects, the invention is an improved solution-phase electrochromic device, wherein a solution, which is a medium of reversibly variable transmittance in the device comprises a solvent, an anodic electrochromic compound, a cathodic electrochromic compound, and, additionally, a tint-providing compound.

The improvement resides in the presence, in the solution of variable transmittance of such a device, of a tint-providing compound. This compound, which does not participate in normal (reversible) operation of the device as an electrochromic compound, provides a slight coloration (tint) to the solution in the device (and, of course, the device itself) when the device is in its zero-potential equilibrium state.

In the preferred application of the improved, tinted, solution-phase electrochromic devices of the invention, they are employed as components of reversibly variable transmittance in dimmable (i.e., reversibly variable reflectance) rearview mirrors in motor vehicles. Such mirrors are also an aspect of the invention. In this regard, the preferred tints provided by the tint-providing compounds are blue.

In still another aspect, the invention entails a solution, which is a medium of reversibly variable transmittance in a solution-phase electrochromic device and comprises a solvent, an anodic electrochromic compound, a cathodic electrochromic compound, and a tint-providing compound.

Further still, the invention entails a blue-tinted, variable reflectance rearview motor vehicle mirror. In one embodiment of such a mirror of the invention, the variable reflectance is provided by a reversibly variable transmittance, single-compartment, solution-phase, self-erasing electrochromic device, wherein the medium of reversibly variable transmittance is a solution which comprises a solvent, an anodic electrochromic compound, a cathodic electrochromic compound and a blue-tint-providing compound.

The improved solution-phase electrochromic devices of the invention are preferably single-compartment and self-erasing. Details on electrochromic devices, including those preferred for the invention, can be found in the patents and patent applications cited above.

A typical solution of a solution-phase electrochromic device is comprised of one or more solvents in which is dissolved one or more anodic electrochromic compounds, one or more cathodic electrochromic compounds and optionally one or more thickening agents, one or more inert, current-carrying (i.e., supporting) electrolytes and one or more ultraviolet (UV) stabilizing agents agents.

The anodic electrochromic compounds are materials which upon electrochemical oxidation increase their molar extinction coefficient at at least one wavelength in the visible portion of the electromagnetic spectrum. The cathodic electrochromic compounds are materials which upon electrochemical reduction increase their molar extinction coefficient at at least one wavelength in the visible portion of the electromagnetic spectrum. In order for the solution-phase electrochromic device of the invention to have a high cycle life in cycling between a high transmission or reflectance condition and a low transmission or reflectance condition, the anodic and cathodic electrochromic compounds should each be stable in at least two oxidation states with respect to unimolecular decomposition and irreversible reactions with other solution components including the solvents, thickening agents, inert electrolytes, UV stabilizer agents and tint-providing compounds.

Tint-providing compounds for use in a solution-phase electrochromic device in accordance with the invention are compounds which are (1) electrochemically inactive over the range of electrochemical potentials at which the device is normally operated (potentials at which the device can be operated with a cycle life that is acceptable for the application in which the device is to be employed); (2) at concentrations which provide acceptable tints, soluble in the solution of the device over the intended temperature range of use of the device, so that undesirable precipitates do not form in this temperature range; (3) as indicated in the immediately preceding paragraph, stable with respect to unimolecular decomposition and irreversible reactions with other solution components; and (4) unreactive with respect to photochemical decomposition itself and photo-initiation of the decomposition of other solution components during the intended use of the device, especially if the device has an intended use which involves sunlight (or other UV light source) exposure. We have discovered, unexpectedly, that tint-providing compounds can be found for solution-phase electrochromic devices. In view of the guidance given by this discovery, and the associated invention disclosed herein, the person of skill will have no difficulty identifying tint-providing compounds acceptable for solution-phase electrochromic devices.

The solvents that can be employed in the solutions of the invention include those well known to the skilled in electrochemistry. Among these are water and polar organic solvents such as N,N-dimethylforamide, dimethyl sulfoxide, various nitriles, such as acetonitrile and glutaronitrile, and cyclic esters or mixtures of cyclic esters, e.g., propylene carbonate, gamma-butyrolactone, gamma-valerolactone, and any homogeneous mixture of any two or more of said solvents or any one or more of said solvents with ethylene carbonate. Also suitable may be mixtures of any of the above solvents. The solvent will typically be liquid at room temperature. The most preferred solvent is neat propylene carbonate. Reference to "consisting essentially of" with reference to a particular solvent composition means that the solvent composition might include small amounts of other substances, such as other solvents, which do not significantly affect the properties of the solvent composition.

An anodic electrochromic compound is one which, in the solvent in its zero-potential, equilibrium state, can be electrochemically oxidized and, upon oxidation, will change (and preferably increase) its molar extinction coefficient at at least one wavelength in the visible light range. The anodic electrochromic material upon electrochemical oxidation will preferably change from having relatively low or zero to having relatively high molar extinction coefficients at some wavelengths in the visible light range, i.e., the compound preferably will change from being relatively colorless or colorless to being relatively colored upon electrochemical oxidation. The anodic electrochromic compound preferably will be stable over a wide temperature range in solution in all of its useful oxidation states both with respect to unimolecular degradation reaction and with respect to degradative reactions with other solution constituents. The oxidation potential of the anodic electrochromic compound preferably will be such that little or no spontaneous oxidation of the compound takes place when the compound is dissolved in a solution comprised of a solvent and a salt of the cation of Formula XX and optionally also comprised of an inert, current-carrying electrolyte, a thickening agent, or a UV-stabilizing compound. Preferred anodic electrochromic compounds are 5,10-dihydro-5,10-dimethylphenazine, N,N,N'.N'-tetramethyl-p-phenylene-diamine, N,N,N',N'-tetraphenyl-p-phenylenediamine, and bis-3,3'-diethyl-2,2'-benzothiazole azine.

In order for electrochemical oxidation to take place with a solution of the invention, the solution will necessarily have some ionic conductivity. This ionic conductivity can be provided by one or both of the electrochromic compounds themselves, if charged, or one or more dissolved, inert current-carrying, electrolyte materials (as described, for example, in the '108 Patent), or any combination of the above.

The '108 Patent provides numerous cathodic electrochromic compounds that can be employed in solutions (and, of course, the devices) of the invention. Preferred among the cathodic electrochromic compounds are those which are salts of bipyridinium cations of Formula XX

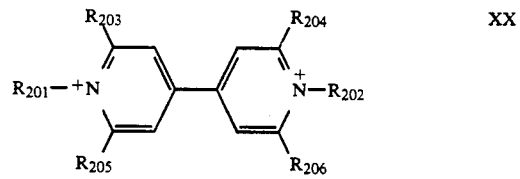

wherein $R_{201}$ and $R_{202}$ are the same or different and are each selected from alkyl, aryl or aralkyl, and $R_{203}$, $R_{204}$, $R_{205}$, and $R_{206}$ are the same or different and are each selected from hydrogen, alkyl, aryl or aralkyl. Preferably, $R_{201}$ and $R_{202}$ are the same and are n-alkyl of 1 to 10 carbons or benzyl and all of $R_{203}$, $R_{204}$, $R_{205}$, and $R_{206}$ are hydrogen, or the cation of Formula XX is a cation of Formula IV

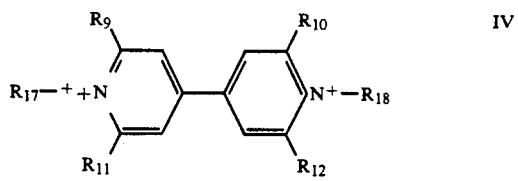

wherein $R_{17}$ and $R_{18}$ are independently selected from the group consisting of an alkyl group with 1–20 carbon atoms, phenyl and benzyl; and $R_9$, $R_{10}$, $R_{11}$, and $R_{12}$ are independently selected from the group consisting of hydrogen and an alkyl group with 1–4 carbon atoms, provided that at least one of $R_9$, $R_{10}$, $R_{11}$, and $R_{12}$ is an alkyl group. The cations of Formula XX or Formula IV are employed in the present invention, e.g., those of Formula XX, are used in the form of salts of various anions. One or more than one type of anion can be associated with each cation. Examples of anions that might be used to form such salts are anions such as $BF_4^-$, $PF_6^-$, $ClO_4^-$, $NO_3^-$, $SO_4^-$, $PO_4^-$, $Cl^-$, $Br^-$, and I⁻. Preferred anions are Cl⁻, Br⁻, BF₄⁻, PF₆⁻, ClO₄⁻; most preferred is BF₄⁻.

The solutions of the invention may also include thickeners, such as polymethylmethacrylate ("PMMA"), thickener derived from acrylic resin beads or sheet material (see the '108 Patent), polyethylene oxide "PEOX"), or other electrochemically inactive polymers which are soluble in the solvent of the solution. Most preferred is polymethylmethacrylate at between about 1 wt. % and 10 wt. % in the solution.

The solutions of the invention may also optionally comprise a UV-stabilizing compound or agent, such as such an agent known in the art for stabilizing plastics against degradation on exposure to UV-light, as from the sun or other sources. Among such UV-stabilizing agents which can be employed to obtain exceptional stability against UV degradation are many that are commercially available, such as the compound ethyl 2-cyano-3,3-diphenyl acrylate, sold by BASF (Parsippany, N.J., USA) under the trademark Uvinul N-35 and by Aceto Corporation (Flushing, N.Y., USA) under the trademark Viosorb 910; the compound 2-ethylhexyl-2-cyano-3,3 diphenyl acrylate, sold by BASF under the trademark Uvinul N-539; the compound 2-(2-hydroxy-4-methyl-phenyl)benzo[d]triazole, sold by Ciba-Geigy Corporation under the trademark Tinuvin P; the compound 2-hydroxy-4-methoxybenzophenone, sold by American Cyanamid under the trademark Cyasorb UV9; and the compound 2-ethyl-2'-ethoxyoxalanilide, sold by Sandoz Color & Chemicals under the trademark Sanduvor VSU. The UV-stabilizing agents or compounds will, if present, typically be present at between about 0.01M and 1.0M, more preferably at between about 0.04M and 0.7M. The more preferred UV stabilizing agents are alkyl esters of 2-cyano-3,3-diphenyl acrylic acid; most preferred is the ethyl ester.

For a solution-phase electrochromic device for which the solution is comprised of propylene carbonate as solvent, 5,10-dihydro-5,10-dimethylphenazine as an anodic electrochromic compound, 1,1-dibenzyl-2,2'6,6'-tetramethylbipyridinium difluoroborate as a cathodic electrochromic compound, polymethylmethacrylate as a thickening agent and ethyl 2-cyano-3,3'-diphenylacrylate as a UV stabilizing agent, the preferred color tint materials for providing a blue tint are azulenes, which are compounds of Formula XII

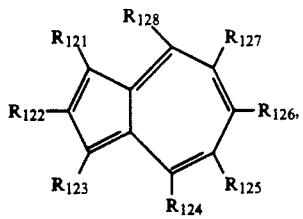

XII wherein $R_{121}$, $R_{122}$, $R_{123}$, $R_{124}$, $R_{125}$, $R_{126}$, $R_{127}$, and $R_{128}$, are the same or different and are each selected from hydrogen or alkyl of 1–20 carbon atoms. Preferred are azulene, where $R_{121}$–$R_{128}$ are all hydrogen, and guaiazulene, where $R_{121}$ and $R_{124}$ are methyl, $R_{127}$ is isopropyl and $R_{122}$, $R_{123}$, $R_{125}$, $R_{126}$, and $R_{128}$ are hydrogen. Most preferred is guaiazulene (1,4-dimethyl-7-isopropylazulene).

Addition of color tint materials to the solutions of solution-phase electrochromic devices can be used for a variety of electrochromic display, window, and mirror application where various colors are desirable for contrast enhancement, background color matching, or purely aesthetic reasons.

Construction of solution-phase electrochromic devices in which color tint material containing solution of the invention can be used as the medium of reversibly variable transmittance, is described in the '108 Patent. The preferred construction of the solution-phase electrochromic device comprises two spaced apart planar sheets of glass, each coated on the surfaces facing each other with a transparent electrode layer of indium-tin oxide or fluorine-doped tin oxide. The preferred method of providing the spacing between the planar sheets and providing the seal which, along with the electrode layers, defines the volume of the solution contained in the solution-phase device is by placing a gasket strip of uncured, thermal-cure epoxy containing glass bead spacer materials on the transparent electrode layer near the perimeter and nearly all the way around the perimeter of one of the planar sheets of glass.

The second planar sheet is placed on top of the gasket strip and pressed until the uncured epoxy strip flows out and the transparent electrode layers are both in contact with the space defining glass beads. The planar glass sheets are offset from each other when the two sheets are placed together so that offset areas of transparent electrode layers extend outside the seal strip and are available for making electrical contact to the electrode layers. Contact is preferably provided with a multi-tooth spring clip or clamp.

Preferably, once the two planar glass sheets are placed together and pressed, the epoxy is cured by heating the assembly. After cooling, the parts are filled with the improved solutions of the invention by a vacuum filling process through the small void left in the gasket seal. Finally the small void in the gasket seal is plugged with a UV-cure adhesive which is then cured by exposure to UV-light.

Tinted solution-phase electrochromic devices of the invention, containing tint-providing compounds in solutions of the invention that are to be used as rearview mirrors for motor vehicles will have the construction described above in which one of the transparent electrode layers is replaced by a metal layer which serves both as an electrode and a reflector surface or, more preferably, will have the construction described above with both electrode layers being transparent and a conventional silvered mirror structure adhered adjacent to one of the planar sheets of glass on the side opposite the transparent electrode layer. This will allow the light to enter the device through one of the planar sheets of glass, pass through the first transparent electrode, through the solution layer of reversibly variable transmittance, (where a variable portion of the light may be absorbed depending on the voltage applied to the device), through the second transparent electrode, through the second planar sheet of glass, then be reflected by the silvered mirror structure and pass back out of the device with a variable portion of the reflected light being absorbed on passing back through the solution layer of reversibly variable transmittance.

Such rearview mirrors are desirable for use as dimmable, glare-relieving, rearview mirrors for motor vehicles. Solution-phase electrochromic devices of the invention, containing solutions of the invention have been found to be highly suitable for use as dimmable, glare-relieving rearview mirrors for use on the outside of motor vehicles because of their dimming capability and desirable blue appearance. It has been discovered for solution-phase electrochromic devices for such use as dimmable outside rearview mirrors for motor vehicles that the sheet resistance of the transparent electrode layer(s) should be from about 1 to 40 ohms per square and that the spacing between the electrode layers in which the solution is contained should be from about 0.008 to about 0.018 centimeters for commercially acceptable performance, in uniformity of coloration, speed on dimming and clearing, and range of reflectance achievable.

Several methods are available in the art to prepare salts of the cations of Formula IV. When $R_9$ and $R_{10}$ are the same, $R_{11}$ and $R_{12}$ are the same, and $R_{17}$ and $R_{18}$ are the same, one method of preparation begins with the compounds of Formula V:

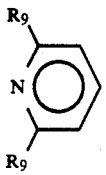

V or Formula VI:

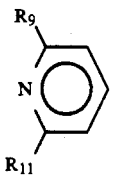

VI wherein $R_9$ and $R_{11}$ are defined as in Formula IV. The compounds of Formulas V and VI are available or readily synthesized by long known methods from starting materials that are commercially available.

Following one of several procedures known in the art (e.g., that of Hunig and Wehner Synthesis (1989), 552 or Baines and Campbell, U.S. Pat. No. 3,227,723), a compound of Formulas V or VI is reacted under nitrogen or another inert gas with a finely divided dispersion of sodium metal in a dry, inert solvent. This is followed by reaction with an oxidizing agent, such as oxygen or sulfur dioxide. After the oxidation, the desired 4,4'-bipyridine product is isolated from the mixture by application of various solvent extraction, fractional distillation, recrystallization and chromatographic techniques well known to the organic chemist.

Once the 4,4'-bipyridine derivative is obtained, it is taken up in a suitable organic solvent, such as acetonitrile, isopropyl alcohol, N,N-dimethylforamide or the like, and reacted at between about 60° C. and about 120° C. (e.g., at refluxing temperature if the solvent is acetonitrile) with a compound of Formula VIII $R_{17}X_{17}$  VIII typically in ratio of at least 4 moles of compound of Formula VIII to 1 mole of the 4,4'-bipyridine. In Formula VIII, $R_{17}$ is alkyl or benzyl and $X_{17}$ is a good leaving group such as iodine, bromine, or the like. This reaction will provide a cation of Formula IV wherein $R_9$ and $R_{10}$ are the same, and $R_{11}$ and $R_{12}$ are the same and wherein $R_{17}$ and $R_{18}$ are the same and the same as $R_{17}$ of Formula VIII and wherein the cation of Formula IV is a salt of the anion $X_{17}$. The reaction with $R_{17}X_{17}$ is continued for between about 12 and about 250 hours. The salt of the desired cation of Formula IV will generally be present as a precipitate at the end of the reaction and can be readily filtered off, washed with the reaction solvent, and the wet filter cake dissolved in water.

A desired salt of the cation of Formula IV is prepared, from the salt obtained from the reaction in which the cation is synthesized, by simply taking the aqueous solution of the salt from the reaction and combining it with a saturated aqueous solution of a water soluble salt of the desired anion. The salt formed by the desired cation with the desired anion will then be obtained as a precipitate from the combined solutions. The precipitate can be isolated, washed, purified and dried using standard techniques to obtain a compound suitable for use as a cathodic electrochromic compound in a solution of the invention. In particular, in this regard, we note that 1,1'-dibenzyl-2,2',6,6'-tetramethyl-bipyridinium diiodide is a known compound (see B. Emmert and J. Stawitz, Chemishe Berichte, 56, 83–91 (1923)) and that preparation from this compound of salts other than the iodide is straightforward.

Preparation of salts of cations of Formula IV wherein $R_9$, $R_{10}$, $R_{11}$, and $R_{12}$ are not the same can be prepared by the method of J. A. Baltrop and A. C. Jackson, J. Chem Soc. Perkin Trans II (1984) 367–371. Compounds of Formula XVI

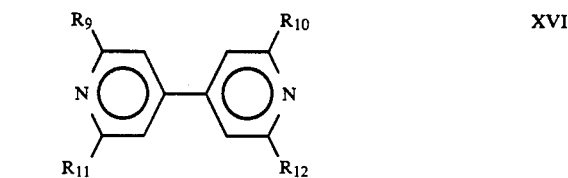

XVI are prepared by reaction of 4,4'-bipyridine with carboxylic acids of Formula IX $R_{15}COOH$  IX wherein $R_{15}$ is alkyl of one to four carbons. The carboxylic acid of choice is dissolved along with 4,4'-bipyridine in an aqueous solution containing sulfuric acid and silver nitrate and the reaction solution is heated to a temperature between about 60° C. and the temperature at which the solution refluxes. Then solid ammonium persulfate is added, and the reaction is allowed to occur for from about 30 minutes to about 8 hours. A mixture of compounds is formed containing: 2-alkyl-4,4'-bipyridine, 2,2'-dialkyl-4,4'-bipyridine, 2,2',6-trialkyl-4,4'bipyridine, and 2,2'6,6'-tetraalkyl-4,4'-bipyridine, wherein the alkyl group is $R_{15}$. The mixture of compounds is extracted with diethyl ether from the aqueous solution after the solution has been made alkaline. The ether is removed by evaporation and the residue is taken up in chloroform. The compounds are separated from each other and undesirable by-products by column chromatography on a column packed with alumina and eluted with 2% ethylacetate in diethyl ether. Fractions of the eluted materials containing a particular alkylated bipyridine are combined and the solvent is removed by evaporation. Mixed alkyl substituents are obtained by reacting mono-,di-, and tri-alkylated bipyridines with compounds of Formula IX where $R_{15}$ is a different length alkyl chain than that which was reacted with the 4,4'-bipyridine initially. By this method it is possible to obtain compounds of Formula IV in which $R_9$, $R_{10}$, $R_{11}$, and $R_{12}$ are the same or different and are hydrogen or alkyl of 1 to 4 carbons with at least one of $R_9$, $R_{10}$, $R_{11}$, and $R_{12}$ being alkyl.

The compounds of Formula XVI are reacted with compounds of Formula VIII by the procedure previously given to produce compounds of Formula IV wherein $R_{17}$ and $R_{18}$ are the same and where $R_9$, $R_{10}$, $R_{11}$, and $R_{12}$ are the same or different, at least one of which is alkyl.

Compounds of Formula IV wherein $R_{17}$ is not the same as $R_{18}$ but both are alkyl of 1 to 20 carbons or benzyl are prepared by first reacting a compound of Formula VIII with the 4,4'-bipyridine, which is the same as the cation of Formula IV except that $R_{17}$ and $R_{18}$ are replaced with hydrogen, with a mole ratio of one of the bipyridine derivatives to one mole or less of compound of Formula VIII. The reaction is carried out by dissolving both compounds in a suitable solvent, such as acetonitrile, isopropyl alcohol, N,N-dimethylformamide or the like and allowing the compounds to react at a relatively low temperature of about 0° C. to about 50° C. This reaction will form a monocation where the alkyl or benzyl group of the compound of Formula VIII is bonded to only one of the nitrogens of the bipyridine. This monocation salt can be removed by filtration, washed with cold reaction solvent and placed in a second reaction with the same solvent but with a compound of Formula XI $$R_{18}X_{18} \qquad \text{XI}$$

wherein $R_{18}$ is alkyl or benzyl and is different than $R_{17}$ and $X_{18}$ is a good leaving group such as iodine, bromine or the like. This second reaction is heated to between about 60° C. and about 120° C. for between 12 and about 250 hours. The precipitate present at the end of this reaction is the $X_{17}$ and $X_{18}$ salt of the cation of Formula IV with $R_{17}$ different from $R_{18}$. The precipitate can be collected, washed, dissolved in water and converted to the salt of the desired anion by the procedure described about for compounds of Formula IV with $R_{17}$ equal to $R_{18}$.

Compounds of Formula IV with $R_{17}$ and/or $R_{18}$ equal to phenyl are prepared by a method similar to that of B.

Emmert and J. Stawitz, Chemishe Berichte, 56, 83–91 (1923). A 4,4'-bipyridine of Formula XVI, or a cation corresponding to such bipyridine in which one of the nitrogens has been quaternarized by reaction with a compound of Formula VIII, is reacted with a 1-halo-2,4-dinitrobenzene in a solvent like isopropyl alcohol or acetonitrile at reflux. The intermediate formed is isolated, washed and reacted with aniline in the same solvent at reflux. This yields a salt of a cation of Formula IV which is derivatized with phenyl at either or both of the 1 and 1' nitrogens. The salt can be converted to the salt of the desired anion by the procedure given above.

Solutions of the invention are readily prepared by simply dissolving the required solutes in the preselected solvent, usually at room temperature, to the desired concentration. The concentration of cathodic compound in a solution to be used for variable transmittance in a solution-phase electrochromic device will usually be from about 0.001M to about 0.1M or the solubility of the cathodic compound in the solvent of interest. Thus, solutions, which comprise anodic compounds and wherein salts of cations of Formula IV are cathodic electrochromic compounds, are straightforwardly prepared, generally as described in the '108 Patent.

In the solutions of the invention, which comprise an anodic compound, it is preferred but not necessary that the anodic compound have two chemically reversible oxidation waves and the cathodic compound have two chemically reversible reduction waves in the solvent of the solution in voltammograms done at room temperature.

In addition to tint-providing compound(s), and optionally thickener(s) or UV-stabilizing agent(s) or both, another component which a solution of the invention may optionally include is inert, current-carrying electrolyte, of which many are known in the art and described in the '108 Patent.

In cases where the anodic compound, or solutions of the anodic together with cathodic compound, may be air-sensitive or otherwise unstable unless isolated from the air, as in an electrochromic device, it is preferable to prepare a solution of the invention, just prior to using the solution to fill an electrochromic device, by combining a first solution, which comprises cathodic but no anodic compound, with a second solution, which is the same as the first solution except that it comprises anodic but no cathodic compound; the examples below include examples of this procedure when the anodic compound is 5,10-dihydro-5,10-dimethylphenazine. Thus, solutions of the invention which comprise solvent and a cathodic compound, but not necessarily an anodic compound, are intermediates for preparing solutions which comprise both anodic and cathodic compounds.

U.S. Pat. No. 4,917,477, the entire disclosure of which is also incorporated herein by reference, provides disclosure by which to operate dimmable, rearview motor vehicle mirrors of the present invention, which comprise solution-phase electrochromic devices of the present invention as components of variable transmittance/reflectance.

While single-compartment and self-erasing electrochromic devices, which comprise both cathodic and anodic electrochromic compounds or substances in solution in a single compartment, are the preferred solution-phase devices contemplated for the present invention, other types of solution-phase electrochromic devices can be encompassed by the invention. For example, a device may have an anodic compound in a compartment separate from that holding the cathodic, so that oxidized anodic compound and reduced cathodic compound do not react with one another in solution to regenerate the respective zero-potential, equilibrium forms; and in such a device the solution in one or both of such compartments may have tint-providing compound as a solute. Alternatively, an anodic compound, that is oxidized in operation of the device, might not be in solution in the device but might persist, in some solid or insoluble form, in both the oxidized and zero-potential, equilibrium states; then a tint-providing compound and a cathodic compound will be in a solution that is in contact with the anodic compound and the cathodic compound, in reduced form in the solution, might simply interact with the anodic compound in oxidized form, somewhat like interacting with an anode, to react to regenerate the zero-potential equilibrium form of the cathodic compound. Still further, the arrangement just described might be reversed, so that the cathodic compound is not in solution and the anodic compound, together with tint-providing compound, is. Persons of skill in the electrochromics art will recognize still other types of solution-phase electrochromic devices.

The invention is described in somewhat more detail in the following, non-limiting examples. "Room temperature" means 20° C.–27° C., typically 23° C.–25° C. Unless otherwise specifically noted, all volumes and concentrations described herein are at room temperature.

EXAMPLE 1

Solution-Phase Electrochromic Devices with Salts of 1,1'-Dibenzyl-2,2',6,6'-Tetramethyl-4,4'-Bipyridinium Dication 2,2',6,6'-tetramethyl-4,4'-bipyridine is a known compound. See U.S. Pat. No. 3,227,723. 100 g of the compound was prepared from 2,6-dimethylpyridine following the method of Hunig and Wehner, Synthesis (1989), 552, using tetrahydrofuran as solvent and sulfur dioxide as oxidizing agent.

12 g of 2,2',6,6'-tetramethyl-4,4'-bipyridine and 27 ml of benzyl bromide were dissolved in 200 ml of acetonitrile and the solution was refluxed at atmospheric pressure for 96 hours. Then 40 ml of benzyl bromide was added to the solution and refluxing at atmospheric pressure was continued for an additional 48 hours. Finally, 30 ml of benzyl bromide was added to the solution and refluxing at atmospheric pressure was continued for a further 96 hours. A yellow precipitate was formed during the reaction. The precipitate was analyzed by high pressure liquid chromatography and found to be predominantly the desired 1,1'-dibenzyl-2,2',6,6'-tetramethyl-4,4'-bipyridinium dibromide.

The yellow precipitate was washed with acetonitrile and acetone, dried, dissolved in water and carbon-treated. The carbon was removed by filtration. To 700 ml of the aqueous solution, 100 ml of a saturated aqueous solution of $NaBF_4$ was added. The desired, title product precipitated. The precipitate was dissolved in 700 ml of hot water, purified by carbon treatment followed by filtration to remove the carbon, and allowed to recrystallize as the water cooled. A second recrystallization from 600 ml of water, followed by filtration and drying, yielded 8.7 g of the title product.

Elemental analysis confirmed that the product was the desired, title compound: Cal'd: C: 59.2, H: 5.3, N: 4.9, B: 3.8, F: 26.8; Found: C: 59.5, H: 5.4, N: 4.9, B:3.7, F: 19.7.

The product from the recrystallization was dried and then used to prepare, with neat propylene carbonate as solvent, a 0.01M solution with 0.5M tetra-n-butylammonium perchlorate as supporting (i.e., "inert, current-carrying") electrolyte. An electrode was placed in the solution and polarized with respect to a counter electrode to a 35 potential sufficient to electrochemically reduce the 1,1'-dibenzyl-2,2',6,6'-tetramethyl-4,4'-bipyridinium dication to the cation radical, as indicated by formation of a dark blue color at the cathode. A cyclic voltammogram at room temperature of this solution after a small amount of dibenzylviologen difluoroborate had been added showed that the title compound had a reduction peak potential of about 90 millivolts more negative than that of the dibenzylviologen.

A solution of 0.032M 1,1'-dibenzyl-2,2',6,6'-tetramethyl-4,4'-bipyridinium difluoroborate, 0.032M 5,10-dihydro-5,10-dimethylphenazine, 0.5M ethyl 2-cyano-3,3-diphenyl acrylate, and 3 wt. % polymethylmethacrylate ("PMMA") in propylene carbonate was prepared as follows as the solution of reversibly variable transmittance for use in a solution-phase electrochromic device. A solution was prepared by dissolving ethyl 2-cyano-3,3-diphenyl acrylate (Viosorb 910, Aceto Corporation) to 0.5M in neat propylene carbonate at room temperature. The solution was then thickened by combining with an aliquot of it 3% (w/w) of polymethylmethacrylate (PMMA) beads and stirring at 60° C. until the beads dissolved completely. The thickened solution was then cooled to room temperature and divided into two parts. 1,1'-dibenzyl-2,2',6,6'-tetramethyl-4,4'-bipyridinium difluoroborate was dissolved to 64 mM at room temperature in one of the parts and 5,10-dihydro-5,10-dimethylphenazine was dissolved to 64 mM at room temperature in the other part. Just prior to use to fill devices, the final solution of reversibly variable transmittance was prepared by mixing equal volumes of the two parts. The final solution was then used to fill a number of devices, which were single-compartment and self-erasing (see the '108 Patent). The devices were suitable for use as the components of reversibly variable transmittance in variable reflectance mirrors, as each had an highly reflecting (silvered) surface adhered adjacent the outside of one of its electrode-layer-bearing walls. The electrode layers of the electrode-layer-bearing walls of the devices were transparent, made of indium-tin oxide, had a sheet resistance of about 12 ohms per square, were substantially planar and parallel (like the sheets of glass to which they were adhered), and were spaced apart by about 0.013 cm. The performance of the devices was excellent for outside motor vehicle rearview mirror use with respect to speed and uniformity of coloration and clearing and range of reflectance. One of the devices was heated without applied potential at 100° C. for 24 hours without the formation of residual color or loss in the range of reflectance attainable with the device due to degradation of the solution. Several of the devices were cycled 35,000 times at 50° C., between high reflectance with 0.0 volts applied between the electrode layers, for 15 sec./cycle, and low reflectance with 1.0 volts applied between the electrode layers, for 10 sec./cycle. The devices showed essentially no degradation in performance after the 35,000 cycles other than a decrease of about 1% in the high-end reflectance (i.e., reflectance at 0.0 volts) measured with the standard CIE curve white light.

EXAMPLE 2

A solution was prepared with propylene carbonate as solvent which contained 0.032 molar dimethylphenazine (i.e., 5,10-dihydro-5,10-dimethylphenazine), 0.032 molar 1,1'-dibenzyl-2,2'6,6'-tetramethylbipyridinium difluoroborate, 0.5 molar ethyl-2-cyano-3,3-diphenylacrylate, 3 wt. % polymethylmethacrylate and 0.025M azulene. This solution was used to fill 6 electrochromic window devices like those described in the '108 Patent with a solution thickness of 130 microns. The devices were blue-tinted, as the color of the devices was blue/purple in their zero potential equilibrium states (highest transmission condition). The devices colored to a dark blue-grey with 1.0 volt applied.

Two of the electrochromic window devices were exposed at about 80° C. to bright light which included about 2.0 mW/cm$^2$ of light in the 320 to 385 nm range, measured at the surface of the devices. Within experimental error, no change in the highest transmission with zero volts applied and a low transmission condition with 1.0 volt applied, measured before and after exposure, occurred as a result of 260 hours of exposure.

Two more of the electrochromic window devices were cycled between their highest transmission condition with zero volts applied and a low transmission condition with 1.0 volt applied for 47,800 cycles with each cycle consisting of applying zero volts for 10 seconds and then applying 1.0 volt for 10 seconds at room temperature. The stability to cycling in the presence of azulene was excellent as evidence by the fact that the highest transmission and the low transmission levels and the speed of transmission change remained the same after the cycling as they were before the cycling.

EXAMPLE 3

A solution was prepared with propylene carbonate as solvent which contained 0.032 molar dimethylphenazine, 0.032 molar 1,1'dibenzyl-2,2',6,6'-tetramethylbipyridinium difluoroborate, 0.5 molar ethyl-2-cyano-3,3-diphenylacrylate, 3 wt. % polymethylmethacrylate and 0.025 molar guaiazulene (1,4-dimethyl-7-isopropylazulene). This solution was used to fill six electrochromic mirrors with tin oxide electrodes on two pieces of glass facing each other, spaced apart by 130 microns, being in contact with the solution and a silver reflector surface on the outside surface (not in contact with solution) of one of the pieces of glass. The mirrors were blue-tinted, as they had an appealing blue to slightly blue-gray appearance in their zero potential equilibrium state (highest reflectance condition).

Two of the mirrors were exposed to bright light as described in Example 2 for 210 hours with no degradation in high or low reflectance achievable and two more of the mirrors were electrochromically cycled for 38,000 cycles as in Example 2 with no degradation in performance due to cycling.

EXAMPLE 4

Two solutions were prepared with propylene carbonate as solvent, each of which contained 0.028 molar dimethylphenazine, 0.028 molar 1,1'-dibenzyl-2,2',6,6'-tetramethylbipyridinium difluoroborate, 0.5 molar ethyl-2-cyano-3,3-diphenylacrylate, 3 wt. % polymethylmethacrylate and either 0.022 molar guaiazulene or 0.03 molar guaiazulene. Each of the two solutions was used to fill several electrochromic mirrors which had solution thicknesses of 141 microns. Each of the mirrors had the shape of the reflector portion of one of two types of commercially available, blue-tint rearview mirror. The blue-tint appearance of all the mirrors constructed in this Example compared very well in hue with the conventional, commercially available blue tint mirrors, that were not dimmable but, rather, were made with colored or interference-type coatings.

EXAMPLE 5

A solution was prepared with propylene carbonate as solvent which contained 0.032 molar dimethylphenazine, 0.032 molar 1,1'-dibenzyl-2,2',6,6'-tetramethylbipyridinium difluoroborate, 0.5 molar ethyl-2-cyano-3,3-diphenyl acrylate and 3 wt. % polymethyl methacrylate. This solution was saturated at room temperature with quinoline yellow, spirit soluble (Colour Index 47000, Solvent Yellow 33), obtained from Aldrich Chemical Company, Milwaukee, Wis., USA as a mixture of two parts of the compound of Formula LI

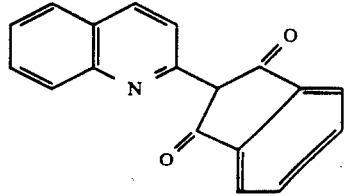

with one part of the compound of Formula LII

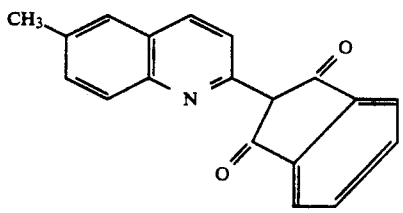

By "quinoline yellow" is meant herein either the compound of Formula LI or a mixture of the compounds of Formulas LI and LII, with at least 50% compound of Formula LI. The solution containing the quinoline yellow was used to fill a window type electrochromic device with 12 ohm per square tin-doped indium oxide electrodes on glass spaced apart by about 130 microns. The device Was filled by the two hole method described in the '108 patent to give a window with a pleasant yellow color. After sealing the holes the device was cycled between its transmission at 0.0 volts and 1.0 volts for 50,000 cycles at room temperature and for 24,000 cycles at 50° C. without any change in appearance or measured change in transmission at 0.0 volts or 1.0 volts.

While the present invention has been described with some specificity herein, those of skill in the pertinent arts will recognize many modifications and variations of what has been described that are nonetheless within the spirit of the invention. It is intended that the invention as described and claimed encompass such modifications and variations.

What we claim is:

1. In a solution-phase electrochromic device, wherein a solution, which is a medium of reversibly variable transmittance, comprises a solvent, an anodic electrochromic compound, and a cathodic electrochromic compound, the improvement which comprises having in said solution a tint-providing compound, which is selected from the group consisting of an azulene and quinoline yellow.

2. The improvement according to claim 1 wherein the electrochromic device is single-compartment and self-erasing and wherein, in the solution of reversibly variable transmittance in the device, dimethylphenazine is the anodic electrochromic compound, and a salt of a viologen is the cathodic electrochromic compound.

3. The improvement according to claim 2 wherein the solution comprises polymethylmethacrylate thickener and an UV-stabilizing agent.

4. The improvement according to claim 3 wherein, in the solution, the solvent is propylene carbonate, the polymethylmethacrylate thickener is present at between about 1% (w/v) and about 5% (w/v), the UV-stabilizing agent is ethyl-2-cyano-3,3-diphenyl acrylate and is present at between about 0.1 molar and 1.0 molar, the dimethylphenazine is present at between about 0.01 molar and about 0.1 molar, and the cathodic compound is 4,4'-dibenzyl-2,2',6,6'-tetramethylbipyridinium difluoroborate and is present at between about 0.01 molar and 0.1 molar.

5. The improvement according to claim 2 wherein the tint-providing compound is selected from the group consisting of azulene, guaiazulene, and quinoline yellow.

6. The improvement according to claim 3 wherein the tint-providing compound is selected from the group consisting of azulene, guaiazulene, and quinoline yellow.

7. The improvement according to claim 3 wherein the tint-providing compound is azulene or guaiazulene.

8. The improvement according to claim 4 wherein the tint-providing compound is azulene or guaiazulene.

9. The improvement according to claim 5 wherein the tint-providing compound is azulene or guaiazulene.

10. The improvement according to claim 9 wherein the tint-providing compound is guaiazulene and is present at a concentration between about 0.01 molar and about 0.03 molar.

11. The improvement according to claim 1 wherein the electrochromic device is the component of reversibly variable transmittance in a variable reflectance motor vehicle mirror.

12. The improvement according to claim 2 wherein the electrochromic device is the component of reversibly variable transmittance in a variable reflectance motor vehicle mirror.

13. The improvement according to claim 3 wherein the electrochromic device is the component of reversibly variable transmittance in a variable reflectance motor vehicle mirror.

14. The improvement according to claim 4 wherein the electrochromic device is the component of reversibly variable transmittance in a variable reflectance motor vehicle mirror.

15. The improvement according to claim 5 wherein the electrochromic device is the component of reversibly variable transmittance in a variable reflectance motor vehicle mirror.

16. The improvement according to claim 6 wherein the electrochromic device is the component of reversibly variable transmittance in a variable reflectance motor vehicle mirror.

17. The improvement according to claim 7 wherein the electrochromic device is the component of reversibly variable transmittance in a variable reflectance motor vehicle mirror.

18. The improvement according to claim 8 wherein the electrochromic device is the component of reversibly variable transmittance in a variable reflectance motor vehicle mirror.

19. The improvement according to claim 9 wherein the electrochromic device is the component of reversibly variable transmittance in a variable reflectance motor vehicle mirror.

20. The improvement according to claim 10 wherein the electrochromic device is the component of reversibly variable transmittance in a variable reflectance motor vehicle mirror.

21. A solution, which is a medium of reversibly variable transmittance in a solution-phase electrochromic device and comprises a solvent, an anodic electrochromic compound, a cathodic electrochromic compound, and a tint-providing compound, which is selected from the group consisting of an azulene and quinoline yellow.

22. A solution according to claim 21 which is the medium of reversibly variable transmittance in a single-compartment, self-erasing, solution-phase electrochromic device, which comprises polymethylmethacrylate at between about 1% (w/v) and about 5% (w/v), which comprises ethyl-2-cyano-3,3-diphenyl acrylate at between about 0.1 molar and 1.0 molar, and wherein the solvent is propylene carbonate, the anodic electrochromic compound is dimethylphenazine at between about 0.01 molar and about 0.1 molar, and the cathodic electrochromic compound is 4,4'-dibenzyl-2,2',6,6'-tetramethylbipyridinium difluoroborate at between about 0.01 molar and 0.1 molar.

23. A solution according to claim 21 wherein the tint-providing compound is azulene or guaiazulene.

24. A solution according to claim 22 wherein the tint-providing compound is azulene or guaiazulene.

25. A solution according to claim 24 wherein the tint-providing compound is guaiazulene at between about 0.01 molar and about 0.03 molar.

26. A tinted, variable reflectance rearview motor vehicle mirror wherein variable reflectance is provided by a reversibly variable transmittance, single-compartment, solution-phase, self-erasing electrochromic device, wherein the medium of reversibly variable transmittance is a solution which comprises a solvent, an anodic electrochromic compound, a cathodic electrochromic compound and a tint-providing compound, which is selected from the group consisting of an azulene and quinoline yellow.

27. A mirror according to claim 26 which is blue-tinted and wherein, in the electrochromic device, the solution of reversibly variable transmittance has an azulene as the blue-tint-providing compound.

28. A mirror according to claim 27 wherein, in the electrochromic device, the solution of reversibly variable transmittance has propylene carbonate as solvent, dimethylphenazine at between about 0.01 molar and about 0.1 molar as the anodic electrochromic compound, 4,4'-dibenzyl-2,2',6,6'-tetramethylbipyridinium difluoroborate at between about 0.01 molar and 0.1 molar as the cathodic electrochromic compound, polymethylmethacrylate at between about 1% (w/v) and about 5% (w/v), and ethyl-2-cyano-3,3-diphenyl acrylate at between about 0.1 molar and 1.0 molar.

29. A mirror according to claim 28 wherein, in the solution, the blue-tint-providing compound is azulene or guaiazulene.

30. A mirror according to claim 29 wherein, in the solution, the blue-tint-providing compound is guaiazulene at between about 0.01 molar and about 0.03 molar.

* * * * *

UNITED STATES PATENT AND TRADEMARK OFFICE
CERTIFICATE OF CORRECTION

PATENT NO. : 5,278,693
DATED : January 11, 1994
INVENTOR(S) : David A. Theiste
Harlan J. Byker It is certified that error appears in the above-indentified patent and that said Letters Patent is hereby corrected as shown below:

Column 13, Line 54 of the Patent, "a 35 potential" should be --a potential--.

Signed and Sealed this

Seventh Day of February, 1995

Attest:

BRUCE LEHMAN

Attesting Officer

Commissioner of Patents and Trademarks